(12) United States Patent
Take et al.

(10) Patent No.: US 8,349,031 B2
(45) Date of Patent: Jan. 8, 2013

(54) BATTERY SEPARATOR AND NONAQUEOUS LITHIUM ION SECONDARY BATTERY HAVING THE SAME

(75) Inventors: Hiroyoshi Take, Osaka (JP); Shunsuke Noumi, Osaka (JP); Sadahiro Nakanishi, Osaka (JP); Yoshihiro Uetani, Osaka (JP); Keisuke Kii, Osaka (JP); Kinkou Sho, Osaka (JP)

(73) Assignee: Nitto Denko Corporation, Osaka (JP)

( * ) Notice: Subject to any disclaimer, the term of this patent is extended or adjusted under 35 U.S.C. 154(b) by 133 days.

(21) Appl. No.: 12/733,610

(22) PCT Filed: Sep. 10, 2008

(86) PCT No.: PCT/JP2008/066807
§ 371 (c)(1),
(2), (4) Date: Mar. 11, 2010

(87) PCT Pub. No.: WO2009/035132
PCT Pub. Date: Mar. 19, 2009

(65) Prior Publication Data
US 2010/0239900 A1    Sep. 23, 2010

(30) Foreign Application Priority Data

Sep. 13, 2007  (JP) .................................. 2007-238411
Aug. 29, 2008  (JP) .................................. 2008-222937

(51) Int. Cl.
*H01M 2/16*     (2006.01)
*H01M 10/00*    (2006.01)
(52) U.S. Cl. ........ 29/623.1; 429/129; 429/144; 429/249
(58) Field of Classification Search .................. 429/129, 429/144, 249; 29/623.1
See application file for complete search history.

(56) References Cited

U.S. PATENT DOCUMENTS
2009/0202898 A1  8/2009  Ichikawa et al.

FOREIGN PATENT DOCUMENTS

| JP | 2-187143 | 7/1990 |
|---|---|---|
| JP | 7-024314 | 1/1995 |
| JP | 11-121012 | 4/1999 |
| JP | 2000-021381 | 1/2000 |
| JP | 2001-052675 | 2/2001 |
| JP | 2002-025527 | 1/2002 |
| JP | 2004-063123 | 2/2004 |
| JP | 2006-128069 | 5/2006 |
| JP | 2007-123254 | 5/2007 |
| JP | 2007-207690 | * 8/2007 |

OTHER PUBLICATIONS

P. Arora et al., "Capacity Fade Mechanisms and Side Reactions in Lithium-Ion Batteries", J. Electrochem. Soc., vol. 145, No. 10, pp. 3647-3667, Oct. 1998.

* cited by examiner

*Primary Examiner* — Brian P Mruk
(74) *Attorney, Agent, or Firm* — Wenderoth, Lind & Ponack, L.L.P.

(57) ABSTRACT

The invention provides a battery separator comprising a porous resin film and a crosslinked polymer supported thereon and having iminodiacetic acid groups in side chains of the polymer chains. The iminodiacetic acid group is preferably represented by the formula

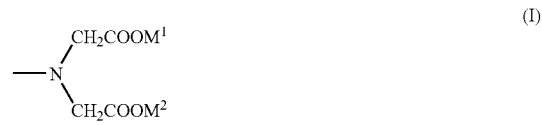

(I)

wherein $M^1$ and $M^2$ are each independently a hydrogen atom, a lithium atom, a potassium atom, a sodium atom, or triethylamine. It is preferred that the layer of the crosslinked polymer is substantially nonporous or solid, and ion conductive, and that the crosslinked polymer has in the molecule oxetanyl groups which are capable of cation polymerization.

13 Claims, No Drawings

BATTERY SEPARATOR AND NONAQUEOUS LITHIUM ION SECONDARY BATTERY HAVING THE SAME

This application is a U.S. national stage of International Application No. PCT/JP2008/066807 filed Sep. 10, 2008.

TECHNICAL FIELD

The invention relates to a battery separator which comprises a porous resin film and a crosslinked polymer supported thereon and having chelate forming groups in the molecule, and which reduces the amount of deposits on the surface of anode and provides a battery little deteriorated in capacity if it is charged and discharged repeatedly at an elevated temperature. The invention further relates to a nonaqueous secondary lithium ion battery using the battery separator, and a method for manufacturing such a nonaqueous lithium ion secondary battery.

BACKGROUND

A lithium ion secondary battery having a high energy density is recently in wide use as a power source for compact portable electronic appliances such as a mobile phone, a note-type personal computer and the like.

Such a lithium ion secondary battery is manufactured through processes of layering or rolling a cathode and an anode in the form of sheet and, for example, a porous resin film together, placing the resulting layered or rolled body in a battery container formed of, for example, a metal can, pouring an electrolytic solution into the battery container, and air-tightly closing and sealing the container. However, in recent years, it is strongly demanded to make such compact portable electronic appliances as mentioned above further small and lightweight. Accordingly, it is also demanded to make a lithium ion secondary battery further thin and lightweight, and a laminate film battery container has come to be employed in place of a conventional metal can container.

Many studies and inventions for providing high capacity and high output lithium ion secondary batteries have also been made on materials for a cathode and an anode. However, in spite of such energetic studies and inventions, there still remains a problem that when a lithium ion secondary battery is repeatedly charged and discharges at ordinary temperature or under an atmosphere at elevated temperature, the capacity of the battery falls, output characteristic deteriorates, and safety reduces.

As the reasons of the above-mentioned problems, there may be mentioned, for example, that lithium deposits on an anode when a battery is charged; metal ions are dissolved in an electrolytic solution from a cathode active material; an organic solvent is oxidized on a cathode to generate cation radicals, which are then reduced on the surface of anode; metal ions are dissolved in an electrolytic solution from a cathode active material and a collector and deposit on the surface of anode; an electrolytic solution is decomposed on the surface of electrodes to generate lithium fluoride, etc. to decrease the amount of lithium ions which contribute to capacity, and as a result, irreversible capacity increases (Pankaj Arora, Ralph E. White, Marc Doyle, Capacity Fade Mechanisms and Side Reactions in Lithium-Ion Batteries", Journal of Electrochemical Society, Vol. 145, No. 10, October 1998).

Under these circumstances, there is strong demand for lithium ion secondary batteries which have high safety. And, for example, it has been proposed to use lithium manganate or lithium iron phosphate as a cathode active material because it is excellent in stability at an elevated temperature. However, lithium manganate has a problem in cycle characteristic at an elevated temperature, while lithium iron phosphate has a problem when power output is to be increased. Thus, neither of the compounds has been put to practical use to a substantial extent up to present.

It is believed that the reason why the cycle characteristic of battery deteriorates at an elevated temperature when lithium manganate is used in a cathode is that manganese in a cathode active material dissolves in an electrolytic solution as ions, and the dissolved manganese ions are reduced and deposited on an anode.

Then, it has been proposed, for example, to use a separator comprising a porous polyethylene resin film and cation exchange resin added thereto in a nonaqueous electrolyte secondary battery using a spinel structure lithium manganese composite oxide in a cathode in order to solve the problems mentioned above (JP 2000-21381A). However, the inventors have found that there is still a problem in such a nonaqueous electrolyte secondary battery that since the proportion of cation exchanging functional groups exposed to the surface of separator is small, metal ions of manganese, etc. are not captured efficiently, and on the other hand, the strength of separator is reduced.

It has been also proposed to use a separator of which surface is modified by cation exchanging groups in a nonaqueous electrolyte secondary battery comprising a manganese-containing composite oxide as active material (JP 2002-25527A). However, the inventors have found that there is still a problem in this case that since the diameter of ions of a metal such as manganese is in general larger than the diameter of pores which a porous membrane used as a separator has, the probability that cation exchange groups encounter metal ions is low so that the metal ions are not captured efficiently, and hence there is a problem in cycle characteristic of the resulting battery at an elevated temperature.

It has been further proposed that in a nonaqueous electrolyte secondary battery comprising a cathode, an anode, a separator and an electrolyte, a chelating agent is contained in at least one of the anode, the separator and the electrolyte (JP 2004-63123A). However, the inventors have found that there is still a problem in this case that the chelating agent causes undesirable side reactions on the cathode and the anode due to oxidation-reduction reactions thereof thereby to deteriorate the battery performance.

Furthermore, it has been proposed that in a nonaqueous electrolyte secondary battery provided with a cathode, an anode, a separator and an electrolyte, a chelate forming polymer is contained in at least one of the cathode, the anode and the separator (JP 11-121012A). However, the inventors have found that there is still a problem in such a battery that the amount of the chelate forming functional groups contained in the battery is small, and accordingly metal ions are not captured efficiently. In addition, the chelate forming polymer has no direct participation in charge and discharge of a nonaqueous secondary battery, and as a consequence, when the chelate forming polymer is contained in the cathode or the anode, the resulting battery has a reduced initial capacity.

DISCLOSURE OF THE INVENTION

Problems to be Solved by the Invention

The invention has been accomplished to solve the problems involved in the conventional nonaqueous electrolyte secondary batteries as mentioned above. Therefore, it is an object of the invention to provide a battery separator which reduces the amount of deposits of metal ions on the surface of anode so that the resulting battery is little deteriorated in capacity if it is repeatedly charged and discharged at an elevated temperature. It is also an object of the invention to provide a nonaqueous lithium ion secondary battery using such a separator as mentioned above. It is a further object of the invention to provide a method for manufacturing a lithium ion secondary battery using such a separator as mentioned above.

Means for Solving the Problems

The invention provides a battery separator comprises a porous resin film and a layer of a crosslinked polymer supported thereon and having iminodiacetic acid groups in side chains of the polymer chain.

According to the invention, the layer of crosslinked polymer is preferably nonporous or solid, and ion conductive. Further according to the invention, the crosslinked polymer preferably has cationically polymerizable oxetanyl groups in the molecule.

The invention also provides a nonaqueous lithium ion secondary battery comprising a cathode comprising a cathode active material, a nonaqueous electrolytic solution, a porous separator, and an anode comprising an anode active material and electrically insulated from the cathode by the porous separator, wherein the porous separator is such a separator as mentioned above.

The invention further provides a method of manufacturing a battery, especially a lithium ion secondary battery using the above-mentioned battery separator.

Effects of the Invention

The battery separator of the invention comprises a porous resin film and a layer of a crosslinked polymer supported thereon and having iminodiacetic acid groups in side chains of the polymer chain. In a battery having such a separator, metal ions dissolved in an electrolytic solution are captured by the chelate forming iminodiacetic acid groups which the crosslinked polymer has. As a result, the metal ions are prevented from depositing on the surface of anode, thereby a nonaqueous secondary battery is provided which is little deteriorated in capacity if it is charged and discharged repeatedly at an elevated temperature. The internal short circuit due to deposition of the metal ions on the anode out of the electrolytic solution can also be prevented.

According to the invention, in particular, when the layer of crosslinked polymer is substantially nonporous or solid, and ion conductive, it is ensured that the metal ions dissolved at a cathode in an electrolytic solution are captured by the iminodiacetic acid groups which the substantially nonporous or solid crosslinked polymer has before they deposit on the surface of anode. This is the reason why the nonaqueous secondary battery excellent in cycle characteristic at an elevated temperature can be obtained by using the separator of the invention.

Further according to the invention, when the crosslinked polymer which the separator has oxetanyl groups capable of cation polymerization therein, at least a part of crosslinked polymer can be cationically polymerized to be further crosslinked, and gelled by bringing the separator into contact with an electrolytic solution containing a cation polymerization catalyst when a battery is manufactured using such a separator. When the crosslinked polymer forms gel together with an electrolytic solution in this manner, the dissolution of crosslinked polymer in an electrolytic solution is effectively prevented to reduce undesirable side reactions on the surfaces of electrodes, thereby providing a nonaqueous secondary battery excellent in performance.

BEST MODE OF CARRYING OUT THE INVENTION

The battery separator of the invention comprises a porous resin film and a layer of a crosslinked polymer supported thereon and having iminodiacetic acid groups in side chains of the polymer chain.

The porous resin film to be used in the invention has micropores preferably of an average pore diameter of 0.01-5 µm and a porosity of 20 to 95%, more preferably a porosity of 30 to 90%, and most preferably a porosity of 40 to 85%.

The battery separator of the invention is obtained by supporting a layer of a crosslinked polymer on a porous resin film. Therefore, when the porous resin film used has too small a porosity, the ion conductive path is diminished so that the use of such a porous resin film as a substrate of separator fails to provide a battery excellent in performance. On the other hand, when the porous resin film has too large a porosity, it has an insufficient strength for use as a substrate of separator. If such a porous substrate resin film is to have a sufficient strength as a substrate, the film must be thick, which results in undesirable increase in internal resistance of battery.

Further according to the invention, the porous resin film to be used has an air permeability preferably of 1500 s/100 cc or less, more preferably 1000 s/100 cc or less. When the porous resin film used has too large an air permeability, it has too small an ionic conductivity for use as a substrate of separator so that it fails to provide a high performance battery.

Furthermore, the porous resin film to be used has a puncture strength preferably of 1 N or more. When the porous resin film having a piercing strength of smaller than 1 N is used as a substrate for a separator, and pressure is applied between the electrodes, it may be torn and internal short circuit may take place.

The porous resin film to be used has a thickness preferably in a range of 3 to 100 µm. When the porous resin film has a thickness of less than 3 µm, it has an insufficient strength so that when it is used as a substrate for a separator, the electrodes may come into contact with each other and internal short circuit may possibly be caused. On the other hand, when the porous resin film has a thickness of more than 100 µm, the membrane resistance of the resulting separator increases, and hence the rate characteristic of the battery is undesirably deteriorated.

According to the invention, any porous film may be used as a substrate of separator with no particular limitation so long as it has such properties as mentioned above. However, in consideration of solvent resistance and redox resistance, a porous film of polyolefin resin such as polyethylene or polypropylene is preferred. Among the exemplified above, a porous film made of polyethylene is particularly preferred since it melts when being heated and closes the micropores so that it provides so-called shut down function to a battery. In this connection, the polyethylene may include not only homopolymers of ethylene but also copolymers of ethylene with an α-olefin such as propylene, butene or hexene.

Further, a laminate film of a porous film of polytetrafluoroethylene, polyimide and the like with the above-mentioned polyolefin porous film is also excellent in the heat resistance and therefore is used preferably as the porous resin film.

According to the invention, the crosslinked polymer may be either a chemically crosslinked polymer or a physically crosslinked polymer. The chemically crosslinked polymer is a polymer which has crosslinked structure formed by chemical reactions, and the physically crosslinked polymer is a polymer which has crosslinked structure formed by hydrogen bonding, electrostatic bonding, or hydrophobic bonding between polymers, or chelate formation of polymer with polyvalent metal ions, etc.

As a representative example of chemically crosslinked polymers, there may be mentioned, for example, a copolymer obtained by copolymerization of a monovinyl monomer and a divinyl monomer as a crosslinking agent. A chemically crosslinked polymer can also be obtained by reacting a polymer having functional groups in the side chains with a polyfunctional compound reactive to the functional groups as a crosslinking agent. As a further example, a linear polymer is reacted with a peroxide or irradiated with radiation so that the polymer is crosslinked to provide a chemically crosslinked polymer.

In turn, as a representative example of physically crosslinked polymers, there may be mentioned, for example, polyvinylidene fluoride, polyacrylonitrile, polymethyl methacrylate, polyethylene oxide, etc.

According to the invention, in particular, as preferred examples of the crosslinked polymers, there is mentioned a crosslinked polymer which is obtained by reacting a polymer having in the molecule reactive groups which are reactive to isocyanate groups with a polyfunctional isocyanate as a crosslinking agent. The reactive group to isocyanate groups mentioned above is not specifically limited, and may include, for example, hydroxyl, carboxyl, amino, imino, urethane, and urea group, etc. Among these groups are particularly preferred hydroxyl and carboxyl groups.

In the preparation of such a crosslinked polymer as mentioned above, the polyfunctional isocyanate used as a crosslinking agent is incorporated into the resulting crosslinked polymer by addition polymerization. Therefore, when the resulting crosslinked polymer is supported on a porous resin film and the resultant is used as a separator, no dissolution of polyfunctional isocyanate in an electrolytic solution takes place, and hence no deterioration of battery performance is caused. In this way, there is obtained a nonaqueous secondary battery which is prevented from deterioration of capacity due to repeated charge and discharge and which is excellent in performance can be obtained.

According to the invention, the crosslinked polymer has iminodiacetic acid groups in side chains of the polymer chain. The iminodiacetic acid group is expressed by the following formula (I).

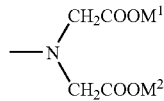

wherein $M^1$ and $M^2$ are each independently a hydrogen atom, a lithium atom, a potassium atom, a sodium atom, or triethylamine.

In particular, according to the invention, at least one of $M^1$ and $M^2$ is preferably a lithium atom or triethylamine, and more preferably both of $M^1$ and $M^2$ are lithium atoms or triethylamine. When at least one of $M^1$ and $M^2$ is a lithium atom, and more preferably when both of $M^1$ and $M^2$ are lithium atoms, the electrode reaction is little influenced because lithium ions are delivered into an electrolytic solution when metal ions dissolved in the electrolytic solution are captured by the iminodiacetic acid groups. On the other hand, when at least one of $M^1$ and $M^2$ is triethylamine, and more preferably when both of $M^1$ and $M^2$ are triethylamine, such an iminodiacetic acid triethylamine salt is easily dissolved in a solvent, such as dimethyl sulfoxide, so that a reaction can be easily performed to provide side chains of the polymer chain of crosslinked polymer with iminodiacetic acid groups.

In order to provide side chains of crosslinked polymer with such iminodiacetic acid groups, by way of example, a crosslinked polymer having therein monomer units which have glycidyl groups in side chains is prepared, and the glycidyl groups of the crosslinked polymer are then reacted with iminodiacetic acid or the aforesaid metal salts (for example, dilithium salt), or an iminodiacetic acid triethylamine salt in an appropriate solvent.

An iminodiacetic acid group is a tridentate ligand formed of two carboxyl group oxygen atoms and one amino group nitrogen atom, and forms a chelate with many metal ions. According to the invention, the separator has a crosslinked polymer supported on a porous resin film, and the crosslinked polymer has chelate forming iminodiacetic acid group in side chains of the polymer chains. Therefore, when a nonaqueous secondary battery has such a separator, it captures metal ions dissolved in an electrolytic solution to suppress the deposition of metal ions on the surface of anode, thereby suppressing a fall of capacity of the battery if it is charged and discharged repeatedly at an elevated temperature. Furthermore, internal short circuit due to metal ions dissolved in an electrolytic solution and deposited on the anode can be prevented as well.

Although the kind of metal ions dissolved in an electrolytic solution is not specifically limited, the metal ions are mainly transition metal ions derived from a cathode active material and metal ions derived from a collector. The transition metal ions derived from a cathode active material are not specifically limited, and they are mainly ions of cobalt, manganese, nickel, iron, or vanadium. These transition metal ions much easily coordinate to chelate forming iminodiacetic acid groups than lithium ions, and are captured efficiently. Improvement of cycle characteristic of battery owing to capture of dissolved metal ions is especially remarkable when the battery uses lithium manganate as a cathode and it is charged and discharged repeatedly at an elevated temperature.

Further according to the invention, a crosslinked polymer is supported on a porous resin film so that the polymer is prevented from dissolving in an electrolytic solution, and as a result, no deterioration of battery performance due to reactions of dissolved polymer at electrodes takes place.

The layer of crosslinked polymer has a thickness usually in the range of 10-6000 nm. When the layer of crosslinked polymer has a thickness smaller than 10 nm, the crosslinked polymer cannot capture effectively metal ions dissolved in an electrolytic solution, and hence the deterioration of cycle characteristic of battery at an elevated temperature cannot be suppressed effectively. However, when the layer of crosslinked polymer has a thickness larger than 6000 nm, deterioration of rate characteristic is undesirably caused on account of increased membrane resistance of the layer of crosslinked polymer. The membrane resistance of the layer of crosslinked polymer refers to electric resistance in consideration of thickness of the layer of crosslinked polymer.

According to the invention, it is preferred that the layer of crosslinked polymer is nonporous or solid, and ion conductive. That the layer of crosslinked polymer is "nonporous or solid" means that the layer has such an air permeability of 10000 s/100 cc or more that it has no air permeability to such an extent that the air permeability cannot be substantially measured. When the layer of crosslinked polymer is substantially nonporous or solid, and ion conductive in this way, metal ions dissolved at a cathode are captured with certainty by the iminodiacetic acid groups of the nonporous or solid crosslinked polymer before they deposit on an anode, thereby the use of separator of the invention makes it possible to manufacture a nonaqueous secondary battery excellent in cycle characteristic at an elevated temperature.

When iminodiacetic acid groups are introduced into a crosslinked polymer in a reaction solvent after the crosslinked polymer has been supported on a porous resin film, the crosslinked polymer is in part dissolved in the reaction solvent, and as a result, the resulting crosslinked polymer supported on the porous resin film into which the iminodiacetic acid groups have been introduced has pores, that is, the crosslinked polymer is porous. On the other hand, when iminodiacetic acid groups are first introduced into a crosslinked polymer, and then the resulting crosslinked polymer is supported on a porous resin film, the crosslinked polymer on the porous resin film is substantially nonporous or solid.

Further according to the invention, it is preferred that the crosslinked polymer has oxetanyl groups, in particular, 3-oxetanyl groups, as a cationically polymerizable functional group, in the molecule. In the manufacturing of battery using such a separator comprising a porous resin film and a crosslinked polymer supported thereon and having oxetanyl groups in the side chains, when the separator is brought into contact with an electrolytic solution containing a cationic polymerization catalyst, at least a portion of the crosslinked polymer is swollen or dissolved in the electrolytic solution so that the crosslinked polymer is cationically polymerized, or further crosslinked, and gelled. In this way, when the crosslinked polymer forms gel together with the electrolytic solution, the dissolution of crosslinked polymer in the electrolytic solution does not take place, thereby reducing undesirable side reactions on the surface of electrodes to provide a nonaqueous secondary battery excellent in performance.

The crosslinked polymer used in the invention can be preferably obtained by copolymerizing at least an alkyl(meth)acrylate and glycidyl (meth)acrylate in an appropriate organic solvent using a radical polymerization initiator, and then by acting a peroxide on the copolymer, or irradiating the copolymer with radiation such as electron beams. The glycidyl group of the glycidyl(meth)acrylate component in the crosslinked polymer is utilized in order to introduce iminodiacetic acid groups into side chains of crosslinked polymer by reacting iminodiacetic acid or dilithium salt thereof with the crosslinked polymer, as mentioned hereinbefore.

As another method for producing a crosslinked polymer, as mentioned hereinbefore, a copolymer having hydroxyl groups in the molecule is obtained by use of hydroxyalkyl (meth)acrylate together with alkyl(meth)acrylate and glycidyl(meth)acrylate, and the copolymer is then reacted with a polyfunctional isocyanate as a crosslinking agent.

As a further method for producing a crosslinked polymer, a copolymer having oxetanyl groups as well as hydroxyl groups in the molecule is obtained by use of (meth)acrylate having 3-oxetanyl groups, for example, 3-(ethyl-3-oxetanyl) (meth)acrylate together with alkyl (meth)acrylate, glycidyl (meth)acrylate and hydroxyalkyl(meth)acrylate, and the copolymer is then reacted with a polyfunctional isocyanate as a crosslinking agent to provide a crosslinked polymer having 3-oxetanyl groups in the molecule.

The lithium ion secondary battery of the invention comprises a cathode comprising a cathode active material, a nonaqueous electrolytic solution, a porous separator, and an anode comprising an anode active material capable of doping and dedoping lithium and arranged in such a manner that it is electrically insulated from the cathode by the porous separator, wherein the porous separator comprises a porous resin film and a crosslinked polymer supported thereon and having iminodiacetic acid groups in side chains of the polymer chains, as mentioned hereinbefore. It is preferred that the layer of the crosslinked polymer is substantially nonporous or solid, and ion conductive, also as described hereinbefore.

According to the invention, such a lithium ion secondary battery can be obtained by layering electrodes on the battery separator as described hereinbefore to obtain an electrode/separator layered body, putting the layered body in a battery container, and pouring a nonaqueous electrolytic solution into the container so that the crosslinked polymer that the separator has is swollen in the electrolytic solution.

As the electrodes, or the cathode and the anode, sheet-shaped electrodes are used which are obtained by supporting an active material, and a conductive material if necessary, on a conductive substrate sheet using a resin binder.

Any cathode active material may be used in the invention so far as it has been used as a cathode active material for nonaqueous lithium ion secondary batteries. As such a cathode active material, there may be mentioned, for example, lithium cobalt oxide, lithium manganese oxide spinel, lithium nickel oxide, olivine-type lithium iron phosphate, etc. Any anode active material may be used in the invention so far as it has been used as an anode active material for nonaqueous lithium ion secondary batteries. As such an anode active material, there may be mentioned, for example, graphite, amorphous carbon, carbon fiber, etc.

The nonaqueous electrolytic solution is composed of a nonaqueous organic solution and an electrolyte dissolved therein, and such electrolytes as lithium hexafluorophosphorate, lithium tetrafluoroborate, lithium perchlorate, etc. are preferably used. When a cationic polymerization catalyst is to be contained in the nonaqueous electrolytic solution, an onium salt is used as the catalyst. According to the invention, as an electrolyte which works also as a cationic polymerization catalyst, at least one selected from lithium hexafluorophosphorate and lithium tetrafluoroborate is preferably used.

The solvent used to dissolve the electrolyte is not specifically limited, and cyclic esters such as ethylene carbonate, propylene carbonate, butylene carbonate, and γ-butyrolactone; ethers such as tetrahydrofuran and dimethoxyethane; and open chain form esters such as dimethyl carbonate, diethyl carbonate and ethyl methyl carbonate are used alone or in combination of two or more.

In particular, according to the invention, when the crosslinked polymer has oxetanyl groups in the molecule, a battery can be obtained by layering electrodes on the separator to obtain an electrode/separator layered body, putting the layered body in a battery container, putting a nonaqueous electrolytic solution containing a cationic polymerization catalyst in the battery container so that at least a part of the crosslinked polymer supported on the separator is swollen or dissolved in the electrolytic solution at least in the vicinity of the interface of the separator and the electrodes, and is cationically polymerized, thereby at least a part of the electrolytic solution is gelled. In such a battery as obtained in this way, the crosslinked polymer supported on the separator is not dissolved in an electrolytic solution, and thus undesirable side reactions of the crosslinked polymer on the surface of electrodes can be diminished to provide a nonaqueous secondary battery excellent in performance.

EXAMPLES

The invention will be explained in more detail with reference to the following examples. However, it is to be understood that the invention is not intended to be limited to these examples.

The properties of separator and the performance of battery are evaluated as described below.

(Thickness of Porous Substrate Resin Film and Separator)

The thickness was measured using a 1/10000 mm thickness gauge and a scanning electron microscopic photograph with 10000 magnification of the cross section.

(Porosity of Porous Resin Film)

The porosity of a porous resin film was calculated from the weight W (g) per unit surface area S ($cm^2$) and the average thickness t (cm) of the porous resin film, and the density d ($g/cm^3$) of the resin forming the porous resin film according to the following equation:

Porosity (%)=(1−(W/S/t/d))×100

(Air Permeability)

The air permeability was measured according to JIS P 8117.

(Puncture Strength)

The piercing test was carried out by using a compressing tester KES-G5 manufactured by Kato Tech. Co., Ltd. The maximum load was read from the load fluctuation curve obtained by the measurement and represented as the piercing strength. Using a needle with a diameter of 1.0 mm and a curvature diameter of the tip end of 0.5 mm, the test was carried out at a speed of 2 cm/s.

(Preparation of Electrode Sheets)

85 parts by weight of lithium manganese oxide as a cathode active material, 10 parts by weight of acetylene black (DENKA BLACK, manufactured by Denki Kagaku Kogyo K.K.) as a conduction aid and 5 parts by weight of vinylidene fluoride resin (KF POLYMER L#1120, manufacture by Kureha Chemical Industry Co., Ltd.) as a binder were mixed together. The resulting mixture was then mixed with N-methyl-2-pyrrolidone to prepare a slurry of a solid content of 15% by weight. The slurry was applied onto a 200 μm-thick aluminum foil (a collector) and the resulting aluminum foil was dried at 80° C. for 1 hour and at 120° C. for 2 hours and then pressed by a roll press to obtain a cathode sheet having an active material layer with a thickness of 100 μm.

80 parts by weight of mesocarbon microbeads (MCMB 6-28, manufactured by Osaka Gas Chemicals Co., Ltd.) as an anode active material, 10 parts by weight of acetylene black (DENKA BLACK, manufactured by Denki Kagaku Kogyo K.K.) as a conduction aid and 10 parts by weight of vinylidene fluoride resin (KF POLYMER L#1120, manufacture by Kureha Chemical Industry Co., Ltd.) as a binder were mixed together. The resulting mixture was then mixed with N-methyl-2-pyrrolidone to prepare a slurry of a solid content of 15% by weight.

The slurry was applied in a thickness of 200 μm to a 20 μm-thick copper foil (a collector) and the resulting copper foil was dried at 80° C. for 1 hour and at 120° C. for 2 hours and then pressed by a roll press to obtain an anode sheet having an active material layer with a thickness of 100 μm.

Comparative Example 1

Manufacture of Battery

A porous polyethylene resin film having a thickness of 16 μm, a porosity of 40%, an air permeability of 300 s/100 cc and a puncture strength 3.0 N was provided. The anode sheet 44 mm square obtained in "Preparation of electrode sheets", the porous polyethylene resin film and the cathode sheet 42 mm square obtained in "Preparation of electrode sheets" were layered in this order. The layered body was placed in an aluminum laminate package and then an electrolytic solution obtained by dissolving lithium hexafluorophosphate in a concentration of 1.0 mol/L in a mixed solvent of ethylene carbonate/diethyl carbonate (1/1 ratio by weight) was poured into the package and then the package was sealed to assembly a lithium ion secondary battery A.

Production Example 1

94 g of methyl methacrylate, 1 g of 4-hydroxybutyl acrylate, 4 g of glycidyl methacrylate, 67 g of ethyl acetate, and 0.2 g of N,N'-azobisisobutyronitrile were placed in a 500 mL capacity three-necked flask equipped with a refluxing condenser, and stirred and mixed for 30 minutes while nitrogen gas was introduced into the flask. Then the resulting mixture was heated to 64° C.

When about 1 hour had passed, radical polymerization was found to start, and the viscosity of the reaction mixture began to rise. After the polymerization was continued for eight hours, the reaction mixture was cooled to about 40° C., and 0.1 g of N,N'-azobisisobutyronitrile was added to the reaction mixture, followed by heating again to 70° C. and post-polymerization for another eight hours. Then, the reaction mixture was cooled to about 40° C., and 166 g of ethyl acetate was added to the reaction mixture, which was stirred until it became even, thereby an ethyl acetate solution a of polyacrylate copolymer was obtained.

Production Example 2

74 g of methyl methacrylate, 1 g of 4-hydroxybutyl acrylate, 4 g of glycidyl methacrylate, 20 g of (3-ethyl-3-oxetanyl) methyl methacrylate, 67 g of ethyl acetate, and 0.2 g of N,N'-azobisisobutyronitrile were placed in a 500 mL capacity three-necked flask equipped with a refluxing condenser, and stirred and mixed for 30 minutes while nitrogen gas was introduced into the flask. Then the resulting mixture was heated to 64° C.

When about 1 hour had passed, radical polymerization was found to start, and the viscosity of the reaction mixture began to rise. After the polymerization was continued for eight hours, the reaction mixture was cooled to about 40° C., and 0.1 g of N,N'-azobisisobutyronitrile was added to the reaction mixture, followed by heating again to 70° C. and post-polymerization for another eight hours. Then, the reaction mixture was cooled to about 40° C., and 166 g of ethyl acetate was added to the reaction mixture, which was stirred until it became even, thereby an ethyl acetate solution b of polyacrylate copolymer was obtained.

Production Example 3

3 g of iminodiacetic acid, 27 g of water, and 1.85 g of lithium hydroxide monohydrate were placed in a 500 mL capacity three-necked flask equipped with a refluxing condenser, and stirred. Then, water was evaporated using an evaporator to provide lithium iminodiacetate as solid.

Production Example 4

3 g of iminodiacetic acid, 15 g of dimethyl sulfoxide, and 12 g of triethylamine were placed in a 500 mL capacity three-necked flask provided with a refluxing condenser, and stirred, thereby a dimethylsulfoxide solution of iminodiacetic acid triethylamine salt was obtained.

Production Example 5

20 g of the ethyl acetate solution a of polyacrylate copolymer obtained in Production Example 1 and 0.06 g of benzoyl peroxide, a crosslinking agent, were dissolved in 3.94 g of ethyl acetate, to prepare a polymer solution c having a 25% by weight concentration.

Ethyl acetate was added to the polymer solution c, and stirred at room temperature, to prepare a uniform polymer solution of 8.3% by weight concentration. The polymer solution was applied onto one side of the same porous polyethylene resin film as mentioned hereinbefore with a wire bar (#20), and the film was heated at 60° C. to vaporize the ethyl acetate. Then the film was placed in a thermostat at 90° C. for 168 hours so that the polyacrylate copolymer was crosslinked, thereby providing a separator 1 comprising the porous polyethylene resin film and a crosslinked polyacrylate copolymer supported on one side of the porous polyethylene resin film. The crosslinked polyacrylate copolymer was found to be 0.5 µm thick.

Production Example 6

20 g of the ethyl acetate solution a of polyacrylate copolymer obtained in Production Example 1 and 0.24 g of a crosslinking agent, a polyfunctional isocyanate (hexamethylene diisocyanate/trimethylol-propane adduct, in the form of ethyl acetate solution, having a solid content of 25% by weight, Colonate HL available from Nippon Polyurethane Industry Co., Ltd.) were dissolved in 3.94 g of ethyl acetate to prepare a polymer solution d of 25% by weight concentration.

Ethyl acetate was added to the polymer solution d, and stirred at room temperature, to prepare a uniform polymer solution of 8.3% by weight concentration. The polymer solution was applied onto one side of the same porous polyethylene resin film as mentioned hereinbefore with a wire bar (#20), and the film was heated at 60° C. to vaporize the ethyl acetate. Then the film was placed in a thermostat at 90° C. for 168 hours so that the hydroxyl groups of the hydroxyethyl methacrylate component in the polyacrylate copolymer was reacted with the isocyanate groups of the crosslinking agent (polyfunctional isocyanate) and the polyacrylate copolymer was crosslinked, thereby providing a separator 2 comprising the porous polyethylene resin film and a crosslinked polyacrylate copolymer supported on one side of the porous polyethylene resin film. The crosslinked polyacrylate copolymer was found to be 0.5 µm thick.

Production Example 7

The ethyl acetate solution b of polyacrylate copolymer was used in place of the ethyl acetate solution a of polyacrylate copolymer in Production Example 6, and otherwise in the same manner as in Production Example 6, the hydroxyl groups of the hydroxyethyl methacrylate component in the polyacrylate copolymer was reacted with the isocyanate groups of the crosslinking agent (polyfunctional isocyanate) so that the polyacrylate copolymer was crosslinked, thereby providing a separator 3 comprising the porous polyethylene resin film and a crosslinked polyacrylate copolymer supported on one side of the porous polyethylene resin film and having cation polymerizable functional groups (oxetanyl groups) therein.

Production Example 8

The separator 1, 500 g of dimethyl sulfoxide, and 2 g of lithium iminodiacetate were placed in a glass container, and heated at 80° C. for 12 hours so that the lithium iminodiacetate was reacted with the glycidyl groups of the glycidyl methacrylate component of the crosslinked polymer, to provide a separator 4 which had iminodiacetic acid groups in side chains of the crosslinked polymer.

Production Example 9

The separator 2 was used in place of the separator 1 in Production Example 8, and otherwise in the same manner as in Production Example 8, a separator 5 which had iminodiacetic acid groups in the crosslinked polymer was obtained.

Production Example 10

The separator 3 was used in place of the separator 1 in Production Example 8, and otherwise in the same manner as in Production Example 8, a separator 6 which had iminodiacetic acid groups in the crosslinked polymer was obtained.

Production Example 11

The ethyl acetate solution b of polyacrylate copolymer was dried using an evaporator, and the obtained solid crosslinked polymer was dissolved in dimethyl sulfoxide. To the resulting solution was added lithium iminodiacetate so that the amount of the lithium iminodiacetate was equimolar to the amount of the glycidyl groups of the glycidyl methacrylate component of the crosslinked polymer. The resulting mixture was reacted at 80° C. for 12 hours under a nitrogen atmosphere, to prepare a solution of crosslinked polymer having iminodiacetic acid group therein. Subsequently, this solution was added dropwise to toluene to obtain solid polymer, which was then washed with purified water, and dried, to obtain solid polymer having iminodiacetic acid groups therein. Then, 1 g of the solid crosslinked polymer was dissolved in 11.0 g of ethyl acetate, and further 0.04 g of a polyfunctional isocyanates, a cross linking agent, was added to the resultant, to prepare a polymer solution e of 8.3% by weight concentration.

The polymer solution was applied onto one side of the same porous polyethylene resin film as mentioned hereinbefore with a wire bar (#20), and the film was heated at 60° C. to vaporize the ethyl acetate. Then the film was placed in a thermostat at 90° C. for 168 hours so that the hydroxyl groups of the hydroxyethyl methacrylate component in the crosslinked polymer was reacted with the isocyanate groups of the crosslinking agent (polyfunctional isocyanate) and the crosslinked polymer was further crosslinked, thereby providing a separator 7 comprising the porous polyethylene resin film, and an even, and non-porous or solid layer of crosslinked polyacrylate copolymer supported on one side of the porous polyethylene resin film and having iminodiacetic acid groups therein. The crosslinked polyacrylate copolymer was found to be 0.5 µm thick.

Production Example 12

The ethyl acetate solution b of polyacrylate copolymer was dried using an evaporator, and the obtained solid crosslinked polymer was dissolved in dimethyl sulfoxide. To the resulting solution was added the dimethyl sulfoxide solution of iminodiacetic acid triethylamine salt obtained in Production Example 4 so that the amount of the iminodiacetic acid triethylamine salt was equimolar to the amount of the glycidyl groups of the glycidyl methacrylate component of the crosslinked polymer. The resulting mixture was reacted at 80° C. for 12 hours under a nitrogen atmosphere, to prepare a solution of crosslinked polymer having iminodiacetic acid group therein.

Subsequently, this solution was added dropwise to toluene to obtain solid polymer, which was then washed with purified water, and dried, to obtain solid polymer having iminodiacetic acid groups therein. Then, 1 g of this solid crosslinked polymer was dissolved in 11.0 g of ethyl acetate, and further 0.04 g of a polyfunctional isocyanates, a cross linking agent, was added to the resultant, to prepare a polymer solution f of 8.3% by weight concentration.

The polymer solution was applied onto one side of the same porous polyethylene resin film as mentioned hereinbefore with a wire bar (#20), and the film was heated at 60° C. to vaporize the ethyl acetate. Then the film was placed in a thermostat at 90° C. for 168 hours so that the hydroxyl groups of the hydroxyethyl methacrylate component in the crosslinked polymer was reacted with the isocyanate groups of the crosslinking agent (polyfunctional isocyanate) and the crosslinked polymer was further crosslinked, thereby providing a separator 8 comprising the porous polyethylene film, and an even, and non-porous or solid layer of crosslinked polyacrylate copolymer supported on one side of the porous polyethylene film and having iminodiacetic acid groups therein. The crosslinked polyacrylate copolymer was found to be 0.5 μm thick.

Comparative Example 2

The separators 1 and 2 were placed between the anode sheet and the cathode sheet, either being mentioned hereinbefore, respectively, so that the porous polyethylene resin film faced the anode sheet and the crosslinked polymer faced the cathode. The resulting layered products were put in aluminum laminate packages, respectively, and then an electrolytic solution composed of a mixed solvent of ethylene carbonate/diethyl carbonate (in a weight ratio of 1/1) which had lithium hexafluorophosphorate dissolved therein in a concentration of 1.0 mol/L, followed by sealing the packages, thereby providing lithium ion secondary batteries B and C, respectively.

Comparative Example 3

The separator 3 was placed between the anode sheet and the cathode sheet, either being mentioned hereinbefore, so that the porous polyethylene resin film faced the anode sheet and the crosslinked polymer faced the cathode. The resulting layered product was put in an aluminum laminate package, and then an electrolytic solution composed of a mixed solvent of ethylene carbonate/diethyl carbonate (in a weight ratio of 1/1) which had lithium hexafluorophosphorate dissolved therein in a concentration of 1.0 mol/L was put in the package, followed by sealing the package. The content in the package was then heated at 70° C. for 7 hours so that the crosslinked polymer carried out cationic polymerization and was thereby further crosslinked, thereby providing a lithium ion secondary battery D.

Example 1

The separators 4 and 5 were placed between the anode sheet and the cathode sheet, either being mentioned hereinbefore, respectively, so that the porous polyethylene resin film faced the anode sheet and the crosslinked polymer faced the cathode. The resulting layered products were put in aluminum laminate packages, respectively, and then an electrolytic solution composed of a mixed solvent of ethylene carbonate/diethyl carbonate (in a weight ratio of 1/1) which had lithium hexafluorophosphorate dissolved therein in a concentration of 1.0 mol/L was put in the packages, followed by sealing the packages, thereby providing lithium ion secondary batteries E and F, respectively.

Example 2

The separator 6 was placed between the anode sheet and the cathode sheet, either being mentioned hereinbefore, so that the porous polyethylene resin film faced the anode sheet and the crosslinked polymer faced the cathode. The resulting layered product was put in an aluminum laminate package, and then an electrolytic solution composed of a mixed solvent of ethylene carbonate/diethyl carbonate (in a weight ratio of 1/1) which had lithium hexafluorophosphorate dissolved therein in a concentration of 1.0 mol/L was put in the package, followed by sealing the package. The content in the package was then heated at 70° C. for 7 hours so that the crosslinked polymer carried out cationic polymerization and was thereby further crosslinked, to provide a lithium ion secondary battery G.

Example 3

The separator 7 was placed between the anode sheet and the cathode sheet, either being mentioned hereinbefore, so that the porous polyethylene resin film faced the anode sheet and the crosslinked polymer faced the cathode. The resulting layered product was put in an aluminum laminate package, and then an electrolytic solution composed of a mixed solvent of ethylene carbonate/diethyl carbonate (in a weight ratio of 1/1) which had lithium hexafluorophosphorate dissolved therein in a concentration of 1.0 mol/L was put in the package, followed by sealing the package. The content in the package was then heated at 70° C. for 7 hours so that the crosslinked polymer carried out cationic polymerization and was thereby further crosslinked, to provide a lithium ion secondary battery H.

Example 4

The separator 8 was placed between the anode sheet and the cathode sheet, either being mentioned hereinbefore, so that the porous polyethylene resin film faced the anode sheet and the crosslinked polymer faced the cathode. The resulting layered product was put in an aluminum laminate package, and then an electrolytic solution composed of a mixed solvent of ethylene carbonate/diethyl carbonate (in a weight ratio of 1/1) which had lithium hexafluorophosphorate dissolved therein in a concentration of 1.0 mol/L was put in the package, followed by sealing the package. The content in the package was then heated at 70° C. for 7 hours so that the crosslinked polymer carried out cationic polymerization and was thereby further crosslinked, thereby providing a lithium ion secondary battery I.

The discharge characteristic of each of the laminate-type lithium ion secondary batteries obtained in the above-mentioned Examples and Comparative Examples was examined. Each of the batteries was charged and discharged three times at a rate of 0.2 CmA at a constant temperature (25° C.), and the third discharge capacity was taken as the initial discharge capacity. The third charge and discharge efficiency was taken as the initial charge and discharge efficiency. Then, the battery was charged at a rate of 0.2 CmA, and then discharged at a rate of 2 CmA thereby to measure a 2 CmA discharge capacity, and the rate characteristic was evaluated by the percentage (%) of the 2 CmA discharge capacity to the initial discharge capacity.

Thereafter, the battery was charged at a rate of 1 CmA and then discharged at a rate of 1 CmA, which was taken as one cycle, and 100 cycle charge and discharge were performed in a thermostat at 45° C. Based on the results obtained, the discharge capacity retention at the 100th cycle was evaluated by the percentage (%) of the discharge capacity at the 100th cycle to the discharge capacity at the first cycle when the charge and discharge at a rate of 1 CmA was started. The results are shown in Table 1.

TABLE 1

|  | Gurley Pearmiability (s/cc) | Initial Discharge Capacity (mAh) | Initial Charge/Discharge Efficiency (%) | Rate Characteristic (2 C./0.2 C.) (%) | Capacity Retention at 100th Cycle (%) |
| --- | --- | --- | --- | --- | --- |
| Comparative Example 1 (A) | 300 | 20.2 | 99.3 | 83.1 | 52.7 |
| Comparative Example 2 (B) | not less than 10000 | 19.8 | 99.0 | 78.0 | 56.7 |
| Comparative Example 3 (C) | not less than 10000 | 20.1 | 99.3 | 79.0 | 57.3 |
| Comparative Example 4 (D) | not less than 10000 | 20.2 | 99.4 | 80.2 | 60.1 |
| Example 1 (E) | 1000 | 20.1 | 99.7 | 82.0 | 79.9 |
| Example 2 (F) | 990 | 20.1 | 99.7 | 81.9 | 80.6 |
| Example 3 (G) | 1010 | 20.2 | 99.8 | 82.2 | 81.5 |
| Example 4 (H) | not less than 10000 | 20.1 | 99.7 | 80.1 | 84.3 |
| Example 5 (I) | not less than 10000 | 20.2 | 99.8 | 81.3 | 84.4 |

As the results are shown in Table 1, metal ions dissolved in an electrolytic solution are efficiently captured by the separator of the invention comprising a porous resin film and a crosslinked polymer supported thereon and having iminodiacetic acid groups in the molecule. As a consequence, there can be obtained a lithium ion secondary battery which is little deteriorated in initial capacity, initial charge and discharge efficiency, as well as rate characteristic, and which is little deteriorated in capacity even if charge and discharge are repeated at elevated temperatures, and hence which is excellent in long term reliability.

The invention claimed is:

1. A battery separator comprising a porous resin film and a layer of a crosslinked polymer supported on the porous resin film, wherein the crosslinked polymer has an iminodiacetic acid group in a side chain represented by formula (I)

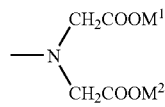

(I)

wherein $M^1$ and $M^2$ are each independently a hydrogen atom, a lithium atom, a potassium atom, a sodium atom, or triethylamine, and wherein the layer of crosslinked polymer is nonporous or solid, and ion conductive.

2. The battery separator according to claim 1, wherein the crosslinked polymer is obtained by reacting a polymer having groups reactive to isocyanate groups with a polyfunctional isocyanate to crosslink the polymer.

3. A nonaqueous lithium ion secondary battery comprising a cathode comprising a cathode active material, a nonaqueous electrolytic solution, a battery separator, and an anode comprising an anode active material, wherein the anode is electrically insulated from the cathode by the battery separator, and wherein the battery separator is the battery separator according to claim 1.

4. A method for manufacturing a battery comprising layering electrodes on the battery separator according to claim 1 to prepare a layered body, putting the layered body in a battery container, and adding an electrolytic solution to the battery container, wherein the crosslinked polymer of the battery separator according to claim 1, which is in contact with the electrolyte solution, swells.

5. A battery separator comprising a porous resin film and a layer of a crosslinked polymer supported on the porous resin film, wherein the crosslinked polymer has an iminodiacetic acid group in a side chain, and has oxetanyl groups in the molecule.

6. The battery separator according to claim 5, wherein the iminodiacetic acid group is represented by formula (I)

wherein $M^1$ and $M^2$ are each independently a hydrogen atom, a lithium atom, a potassium atom, a sodium atom, or triethylamine.

7. The battery separator according to claim 5, wherein the crosslinked polymer is obtained by reacting a polymer having groups reactive to isocyanate groups with a polyfunctional isocyanate to crosslink the polymer.

8. The battery separator according to claim 5, wherein the layer of crosslinked polymer is nonporous or solid, and ion conductive.

9. A nonaqueous lithium ion secondary battery comprising a cathode comprising a cathode active material, a nonaqueous electrolytic solution, a battery separator, and an anode comprising an anode active material, wherein the anode is electrically insulated from the cathode by the battery separator, and wherein the battery separator is the battery separator according to claim 5.

10. A method for manufacturing a battery comprising layering electrodes on the battery separator according to claim 5 to prepare a layered body, putting the layered body in a battery container, and adding an electrolytic solution to the battery container, wherein the crosslinked polymer of the battery separator according to claim 5, which is in contact with the electrolyte solution, swells.

11. A method for manufacturing a battery comprising layering electrodes on the battery separator according to claim 5 to prepare a layered body, putting the layered body in a battery container, and adding an electrolytic solution containing a cationic polymerization catalyst to the battery container, wherein at least a part of the crosslinked polymer is swollen or dissolved in the electrolytic solution in the vicinity of an interface between the battery separator and the electrodes, and the crosslinked polymer is cationically polymerized thereby gelling at least a part of the electrolytic solution.

12. The method for manufacturing a battery according to claim 11, wherein the cationic polymerization catalyst is an onium salt.

13. The method for manufacturing a battery according to claim 11, wherein the electrolytic solution comprises at least one of lithium hexafluoro-phosphorate and lithium tetrafluoroborate as an electrolyte, and cationic polymerization catalyst.

* * * * *